(12) United States Patent
Lin et al.

(10) Patent No.: US 9,189,623 B1
(45) Date of Patent: Nov. 17, 2015

(54) HISTORICAL BEHAVIOR BASELINE MODELING AND ANOMALY DETECTION IN MACHINE GENERATED END TO END EVENT LOG

(71) Applicant: EMC Corporation, Hopkinton, MA (US)

(72) Inventors: Derek Lin, San Mateo, CA (US); ChunSheng Fang, San Mateo, CA (US)

(73) Assignee: EMC Corporation, Hopkinton, MA (US)

( * ) Notice: Subject to any disclaimer, the term of this patent is extended or adjusted under 35 U.S.C. 154(b) by 53 days.

(21) Appl. No.: 13/956,091

(22) Filed: Jul. 31, 2013

(51) Int. Cl.
 *H04L 29/06* (2006.01)
 *G06F 21/55* (2013.01)
 *G06F 21/56* (2013.01)

(52) U.S. Cl.
 CPC ............... *G06F 21/55* (2013.01); *G06F 21/56* (2013.01); *H04L 63/1425* (2013.01)

(58) Field of Classification Search
 CPC .................................................. H04L 63/1425
 USPC .......................................................... 726/23
 See application file for complete search history.

(56) References Cited

U.S. PATENT DOCUMENTS

| 8,745,759 | B2 * | 6/2014 | Halas | 726/30 |
| 2004/0059947 | A1 * | 3/2004 | Lee | 713/201 |
| 2009/0204250 | A1 * | 8/2009 | Potyrailo et al. | 700/109 |
| 2010/0122120 | A1 * | 5/2010 | Lin | 714/47 |
| 2011/0307424 | A1 * | 12/2011 | Jin et al. | 706/12 |
| 2012/0117254 | A1 * | 5/2012 | Ehrlich et al. | 709/228 |
| 2012/0278021 | A1 * | 11/2012 | Lin et al. | 702/85 |
| 2013/0139247 | A1 * | 5/2013 | Cianfrocca | 726/14 |
| 2014/0207724 | A1 * | 7/2014 | Ledenev et al. | 706/47 |
| 2014/0259156 | A1 * | 9/2014 | Beutel et al. | 726/22 |

OTHER PUBLICATIONS

Wang et al., "Profiling Program and User Behaviors for Anomaly Intrusion Detection Based on Non-negative Matrix Factorization", 2004, pp. 99-104.*

Ye, "A Markov Chain Model of Temporal Behavior for Anomaly Detection", 200, pp. 171-174.*

* cited by examiner

*Primary Examiner* — Mohammad L Rahman
*Assistant Examiner* — Thaddeus Plecha
(74) *Attorney, Agent, or Firm* — Van Pelt, Yi & James LLP

(57) ABSTRACT

A bipartite graph is generated which includes one or more source vertices and one or more destination vertices. For a given source vertex, a temporal behavioral matrix is generated using the bipartite graph where a first dimension of the temporal behavioral matrix is associated with time and a second dimension of the temporal behavioral matrix is associated with at least some of the one or more destination vertices. For the given source vertex, a model is generated using at least some portion of the temporal behavioral matrix. Anomaly detection is performed on at least part of the temporal behavioral matrix using the model.

23 Claims, 8 Drawing Sheets

← 300

Temporal Behavioral Matrix for User A
(Number of Days Accessed in a Week)

|  | 310 | 312 |
|---|---|---|
| Server 1 | 5 | 0 |
| Server 2 | 5 | 0 |
| Server 3 | 5 | 0 |
|  | Week of June 24, 2013 | Week of July 1, 2013 |

← 350

Temporal Behavioral Matrix for User B
(Number of Days Accessed in a Week)

|  | 360 | 362 |
|---|---|---|
| Server 3 | 1 | 1 |
| Server 4 | 1 | 1 |
|  | Week of June 24, 2013 | Week of July 1, 2013 |

Temporal Behavioral Matrix
(Money Spent at Merchant)

|  | Dec. 2010 | Dec. 2011 | Dec. 2012 |
|---|---|---|---|
| Merchant 1 |  |  |  |
| Merchant 2 |  |  |  |
| Merchant 3 |  |  |  |

← 702

Temporal Behavioral Matrix
(Number of Work Days Accessed in a
Work Week)

|  | Shut-down 2010 | Shut-down 2011 | Shut-down 2012 |
|---|---|---|---|
| Server 1 |  |  |  |
| Server 2 |  |  |  |
| Server 3 |  |  |  |

← 704

Temporal Behavioral Matrix
(Number of ATM Withdrawals)

|  | Jun. - Aug. 2010 | Jun. - Aug. 2011 | Jun. - Aug. 2012 |
|---|---|---|---|
| Metro Area 1 |  |  |  |
| Metro Area 2 |  |  |  |
| Metro Area 3 |  |  |  |

FIG. 7

HISTORICAL BEHAVIOR BASELINE MODELING AND ANOMALY DETECTION IN MACHINE GENERATED END TO END EVENT LOG

BACKGROUND OF THE INVENTION

Assets (such as money, products, or information) which are accessible via a network are vulnerable to thieves and other harmful users. In some cases, an identity thief steals the credentials of a legitimate user (e.g., login and password, credit card number, Medicare number, etc.) and makes purchases or accesses information without the knowledge of and/or authorization of the legitimate user. In some other cases, the owner of the credentials is the one doing the stealing. For example, an employee may be stealing intellectual property or trade secrets. Techniques which detect these unauthorized accesses would be desirable. Furthermore, it would be desirable if these techniques are able to sort through and process massive amounts of data (e.g., "big data").

BRIEF DESCRIPTION OF THE DRAWINGS

Various embodiments of the invention are disclosed in the following detailed description and the accompanying drawings.

FIG. 3 is a diagram showing two embodiments of a temporal behavioral matrix.

FIG. 7 is a diagram showing some embodiments of seasonal or periodic temporal behavioral matrices.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
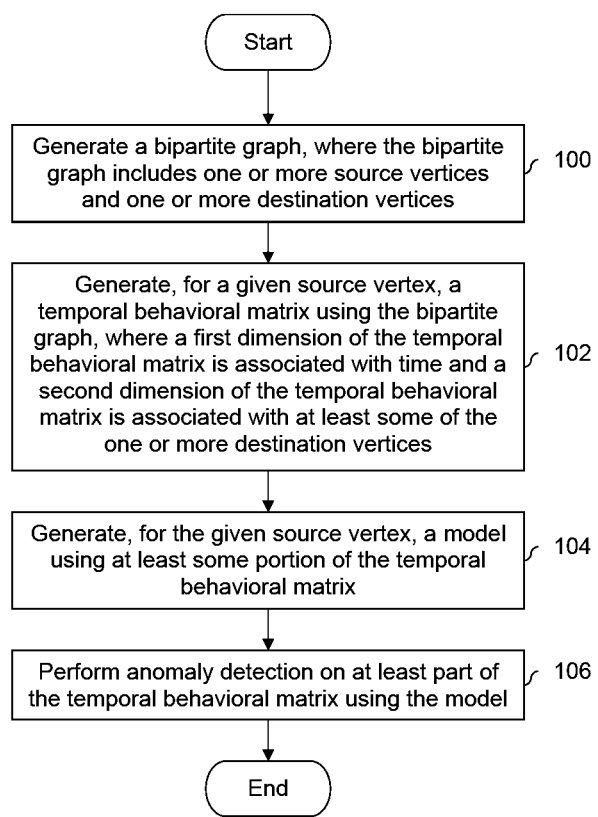
FIG. 1 is a flowchart illustrating an embodiment of a process for performing anomaly detection.

FIG. 1 is a flowchart illustrating an embodiment of a process for performing anomaly detection. In some embodiments, the process is performed by a massively parallel processing (MPP) system and/or distributed "big data" system. Some example systems include Greenplum Database and Pivotal HD.

At 100, a bipartite graph is generated, where the bipartite graph includes one or more source vertices and one or more destination vertices. In bipartite graphs, vertices are divided into two categories: a source vertex or a destination vertex. A vertex cannot be both a source vertex and a destination vertex; it can only be one of the two. Each edge in the graph connects one source vertex and one destination vertex; edges are not permitted to connect two source vertices or two destination vertices together.

Figure 2:
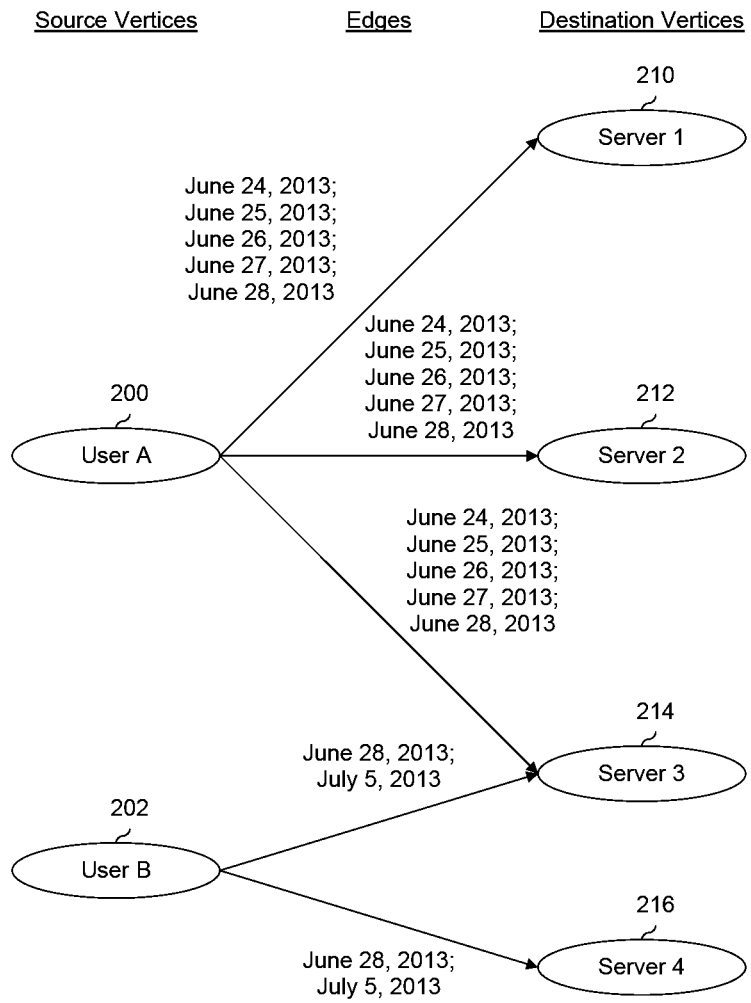
FIG. 2 is a diagram showing an embodiment of a bipartite graph.

FIG. 2 is a diagram showing an embodiment of a bipartite graph. Source vertices and destination vertices may comprise any person, device, entity, point, or node (e.g., captured or recorded in a log). Vertices may be tangible or non-tangible, or they may be logical or physical. In the example of FIG. 2, source vertices are users. Some other examples of source vertices include mobile telephones (e.g., identified by a telephone number or a unique device identifier), laptops, automated teller machines, social security numbers, Medicaid numbers, or credit card numbers. In the example of FIG. 2, destination vertices are servers. Some other examples of destination vertices include applications (e.g., a versioning application for code development, an application for purchase orders and fulfillment, a computer-aided design (CAD) application, etc.), websites, mobile telephones (e.g., identified by a telephone number or a unique device identifier), laptops, automated teller machines, merchants (e.g., bricks and mortar and/or online), or purchased products.

Likewise, edges may comprise any information associated with a given source vertex and a given destination vertex. In the example of FIG. 2, edges are associated with the days (over the period of Jun. 24, 2013-Jul. 7, 2013) during which a given user accessed a given server. For example, user A (200) accessed each of servers 1-3 (210, 212, and 214) every day from Jun. 24, 2013-Jun. 28, 2013. User B (202) accessed each of servers 3 and 4 (214 and 216) on Jun. 28, 2013 as well as Jul. 5, 2013. In other embodiments, edges are associated with (for example) bytes transferred, telephone calls, or login failures, and so on between a source vertex and a destination vertex.

Although FIG. 2 has at most one edge between a source vertex and a destination vertex, in some other embodiments there may be any number of edges between a source vertex and a destination vertex. In various embodiments, information associated with an edge may be stored or arranged in any manner. For example, in some embodiments, the dates associated with the edges shown in FIG. 2 are stored as separate rows, columns, or other entries (e.g., the dates associated with the edge between user A (200) and server 1 (210) may be stored as 5 separate entries in a table or database). Storing information in this manner may be desirable because subsequent processes can then selectively choose what to ingest or filter in/out.

Returning to FIG. 1, at 102, for a given source vertex, a temporal behavioral matrix is generated using the bipartite graph, where a first dimension of the temporal behavioral matrix is associated with time and a second dimension of the temporal behavioral matrix is associated with at least some of the one or more destination vertices. FIG. 3 is a diagram showing two embodiments of a temporal behavioral matrix. Diagram 300 shows a temporal behavioral matrix associated with user A (200 in FIG. 2) and diagram 350 shows a temporal behavioral matrix associated with user B (202 in FIG. 2).

In both temporal behavioral matrix 300 and temporal behavioral matrix 350, the x-axis corresponds to time and the y-axis corresponds to server. Servers (or, more generally, destination vertices) for which there is no edge for a particular user are not included as a row. As such, temporal behavioral matrix 300 does not include a row for server 4 (since there is no edge between user A (200) and server 4 (216) in FIG. 2) and temporal behavioral matrix 350 does not include rows for servers 1 and 2 (since there is no edge between user B (202) and server 1 (210) and server 2 (212) in FIG. 2). In some embodiments, the total number of source vertices and/or destination vertices is very large and having no row in a temporal behavioral matrix where there is no edge may keep a table or database smaller and easier to manage.

In the example of FIG. 3, the values in temporal behavioral matrix 300 and temporal behavioral matrix 350 indicate the number of days a given server was accessed by the user in question for a particular week (i.e., the permitted values are within the range [0, 7]). From the access days shown for the edges in FIG. 2, the values shown in temporal behavioral matrix 300 and temporal behavioral matrix 350 may be obtained. In other embodiments, the values in temporal behavior matrix indicate the total number of bytes transferred, total number of phone calls made, or total number of login failures.

In general, the value of an entry in a temporal behavioral matrix is generated by an aggregate function which inputs, from a bipartite graph, one or more values and generates a single value (i.e., an aggregate function, in general, maps a set of values into a single value). For example, for user A, server 1, and the week of Jun. 24, 2013, (Jun. 24, 2013, . . . , Jun. 28, 2013) is mapped to 5 as a number of observed days that have connections. Any type of aggregate function may be used, such as an average, median, minimum, maximum, number above a threshold, etc.

In various embodiments, various parameters may be used to vary or adjust the temporal behavioral matrix generated at 102. For example, one parameter may affect how much history is used to generate the temporal behavioral matrix (e.g., past week, past month, past 3 months, etc.). Another parameter may affect the width of each "bin" in the x-axis of the temporal behavioral matrix. For example, for temporal behavioral matrix 300 and temporal behavioral matrix 350, that parameter may be set to "weekly" as opposed to "daily" or "monthly." In various embodiments, various parameters may be tuned to achieve a particular desired temporal behavioral matrix.

Returning to FIG. 1, at 104, for the given source vertex, a model is generated using at least some portion of the temporal behavioral matrix. In some embodiments, a model generated at 104 is a principal component analysis (PCA) model. In some other embodiments, a model generated at 104 is a k-nearest neighbor model or a one-class support vector machine (SVM) model.

In one embodiment, the PCA approach is formulated as described below: first of all, the behavior vector consists of feature values derived from the bipartite graph.

$$x_t = \begin{pmatrix} server1 \\ server2 \\ server3 \\ \ldots \\ serverN \end{pmatrix}$$

Over a time period $1<=t<=T$, data of a site is represented by the matrix X, $$X=\{x_1, x_2, \ldots x_t, \ldots x_T\}$$

In this example, PCA is performed on the matrix X with proper data normalization steps of mean removal and scaling. Eigenvectors of X are found. Eigenvectors are ordered according to their corresponding eigenvalues. K eigenvectors corresponding to the K largest eigenvalues are chosen according to some defined criteria. Let P be the identified eigenvectors. Loosely speaking, this eigen space is the 'model' that models the space X. A vector from X is compared against this model to see how far it deviates from the model. An anomaly is declared if the deviation is large.

In some embodiments, a criteria to choose the K largest eigenvalues $a_k$ is to use "EigenMass" criteria: the ratio between the sum of these K eigenvalues and the sum of all eigenvalues is greater than a prescribed threshold h. That is, $$\sum_{k=1}^{K} a_k \Big/ \sum_{k=1}^{R} a_k \geq h$$

The threshold h controls how closely the subspace spanned by the chosen eigenvectors should approximate the original space.

Given a vector $x_t$ in the space of X, it is tested to see if it is anomalous. We project it to the space of $PP^T$. The error residual in $x_t$ not capture by $PP^T$ is $e_t$ (also referred to as a reconstruction error), $$e_t = \|x_{t,e}\| = x_t - x_{t,r}\| = \|(I - PP^T)x_t\|$$

where $x_t = x_{t,e} - x_{t,r}$; $x_{t,e}$ is the part by that is explainable by the model (i.e., normal subspace); $x_{t,r}$ is the residual part from the model (i.e., anomalous subspace).

Returning to FIG. 1, at 106, anomaly detection is performed on at least part of the temporal behavioral matrix using the model. In some embodiments, a temporal behavioral matrix is processed at 106 by having a model input one or more columns in the temporal behavioral matrix (i.e., "bins" of time). For example, in FIG. 3, a model associated with user A takes as input column 310 or column 312. Similarly, a model associated with user B takes as input column 360 or column 362. In some embodiments, a model outputs an anomaly score at 106 and if some threshold is surpassed, an anomaly is flagged or indicated. In some embodiments, step 106 includes post processing to reduce the number of false positives. An example of post processing is described in further detail below.

In some embodiments, there is a parameter associated with a training and testing split between training (i.e., generating the model at 104) and testing (i.e., using the model at 106). For example, if the parameter is a training percentage parameter and equals 75%, then 75% of the temporal behavioral matrix is used to generate the model at 104 and the other 25% of the temporal behavioral matrix is processed at 106 using the generated model.

In various embodiments, various anomalies may be detected using the process described above. In one example, an anomaly detection process attempts to detect disgruntled employees who are accessing and stealing company intellectual property. Although employees may be permitted to access a number of applications or servers, they may typically only access ones which relate to their job description. For example, an engineer may typically only access engineering related applications or servers. If that engineer suddenly started accessing applications or servers which store customer purchase orders, then that may be flagged as an anomaly. In this example, the destination vertices may be an application or a server.

In another example, an anomaly detection process attempts to detect Medicare fraud. A relatively healthy patient with pre-diabetes may only use his/her Medicare benefits for blood sugar testing strips and appointments with a registered dietician or primary care physician. A claim for a motorized wheelchair may be flagged as an anomaly. In this example, the source vertices may be Medicare numbers and the destination vertices may be Healthcare Common Procedure Coding System (HCPCS) codes (i.e., a billing code for medical procedures) and/or National Drug Codes (NDC) numbers (i.e., a billing code for drugs).

One advantage to the anomaly process described herein is that (in at least some cases) it is able to detect harmful behavior before any true damage occurs. For example, in the industrial espionage example described above, the person may be unfamiliar with the financial information being accessed and has to look through a variety of folders or documents before deciding what to steal. The anomaly detection process is (in at least some cases) able to detect the anomaly (e.g., of an engineer who normally only accesses engineering related applications and servers suddenly accessing applications or servers containing financial information; or of an engineer who access a set of code repository servers with a higher access frequency and patterns than historically observed) and intervene before any financial information is actually stolen.

In some embodiments, a bipartite graph is generated at step 100 using a log. In many applications, a log is very large because there are many source vertices being tracked, there are many destination vertices being tracked, and/or there is a lot of activity in the system. In some cases, a log may comprise "big data." The following figure shows an embodiment of an anomaly detection process performed in a big data system.

Figure 4:
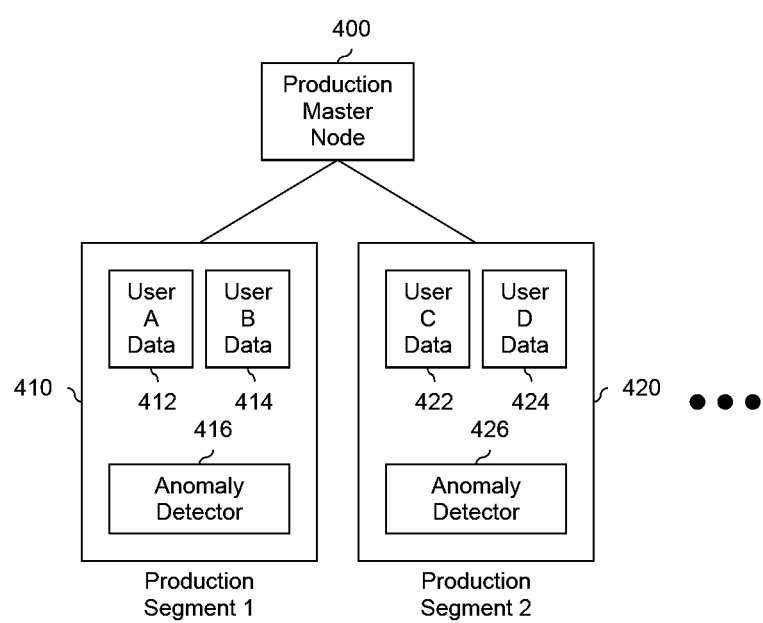
FIG. 4 is a diagram showing an embodiment of an MPP system which performs anomaly detection.

FIG. 4 is a diagram showing an embodiment of an MPP system which performs anomaly detection. In MPP systems, data is divided up amongst multiple segments which perform parallel processing. This architecture enables massive amounts of data to be processed in a reasonable amount of time. In the example shown, the system includes a production master node (400) and a plurality of production segments (410, 420, etc.). Each of the production segments includes data for certain users. For example, production segment 1 (410) includes data for user A (412) and user B (414) and production segment 2 (420) includes data for user C (422) and user D (424). In this example, data for a given user is confined to a single production segment so that (for example) all of the data for user A is on production segment 1 (410). Any number of users may be associated with a production segment (e.g., the number of users do not need to be the same and/or there can be three or more users associated with a production segment).

Master node 400 and production segments 410 and 420 are referred to as "production" because they are production systems (e.g., as opposed to secondary, non-production systems dedicated to testing, backup, or security). Since segments 410 and 420 are production segments, user data 412, 414, 422, and 424 originate from production segments 410 and 420. For example, user data 412, 414, 422, and 424 may comprise logs which are "thrown off" by productions segments 410 and 420.

Each of production segments 410 and 420 include an anomaly detector (416 and 426, respectively) which performs the anomaly detection technique described herein. For example, anomaly detector 416 detects anomalies for user A and user B, and anomaly detector 426 detectors anomalies for user C and user D.

In this example system, instead of having an anomaly detector on production master node 400 (or some other device) and moving all of the user data from production segments 410 and 420 to production master node 400, the anomaly detectors are sent to where the data originates. Since user data 412, 414, 422, and 424 may comprise "big data" that is very large, eliminating the copying of user data 412, 414, 422, and 424 off of their respective production segments makes performing anomaly detection faster. This technique also does not impede or interfere with other processes because I/O resources are not consumed (e.g., between production segment 410 or 420 and production master node 400).

In some embodiments, anomaly detectors 416 and 426 are implemented as scripts, for example in Perl or Python, and production segments 410 and 420 have the ability to run scripts. This enables anomaly detectors 416 and 426 to be run on production segments 410 and 420, respectively. Any appropriate protocol, platform, or interface may be used to run an anomaly detector on a production segment.

An anomaly may comprise a variety of anomaly types. In some applications, certain types of anomalies are of more interest than other types of anomalies. For example, with respect to usage, anomalies may be classified as either an anomaly associated with increased usage or increased activity (e.g., with respect to a given source vertex and a given destination vertex). This type of anomaly is hereinafter referred to as a hyperactive anomaly. An anomaly associated with decreased usage or activity (e.g., with respect to a given source vertex and a given destination vertex) is referred to hereinafter as a hypoactive anomaly. A hyperactive anomaly may be of more interest than a hypoactive anomaly. The following figures describe some embodiments of techniques for refining anomaly detection. Such techniques may be attractive because they reduce the number of false positives.

Figure 5:
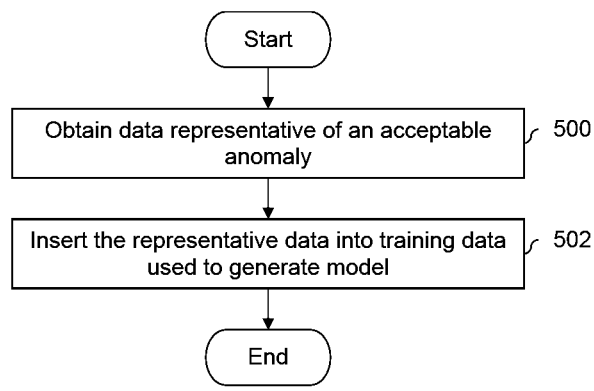
FIG. 5 is a flowchart illustrating an embodiment of a process for incorporating representative data associated with an acceptable anomaly into a model.

FIG. 5 is a flowchart illustrating an embodiment of a process for incorporating representative data associated with an acceptable anomaly into a model. In some embodiments, the example process shown is performed at step 100 in FIG. 1. In some embodiments, the example process is performed at step 102 in FIG. 1.

At 500, data representative of an acceptable anomaly is obtained. At 502, the representative data is inserted into training data used to generate the model. In some embodiments, the representative data is inserted into a temporal behavioral matrix. For example, suppose that a temporal behavioral matrix has values which correspond to the number of days in a week a given user accessed a particular server (e.g., as in FIG. 3). If the columns of the temporal behavioral matrix which are used to generate a model only include weeks where the user was at work, then a vacation week (where the user does not access any servers at all) will be flagged as an anomaly. Such a hypoactive anomaly may be less interesting than a hyperactive anomaly. For example, a more interesting anomaly may be if a user starts accessing a server which they previously had not accessed before (this is one example of a hyperactive anomaly). In this example, a column of all 0s (representative of what a vacation week might look like) is inserted into a temporal behavioral matrix in the example process. Other columns which are representative of other acceptable anomalies may be inserted in other embodiments.

Figure 6:
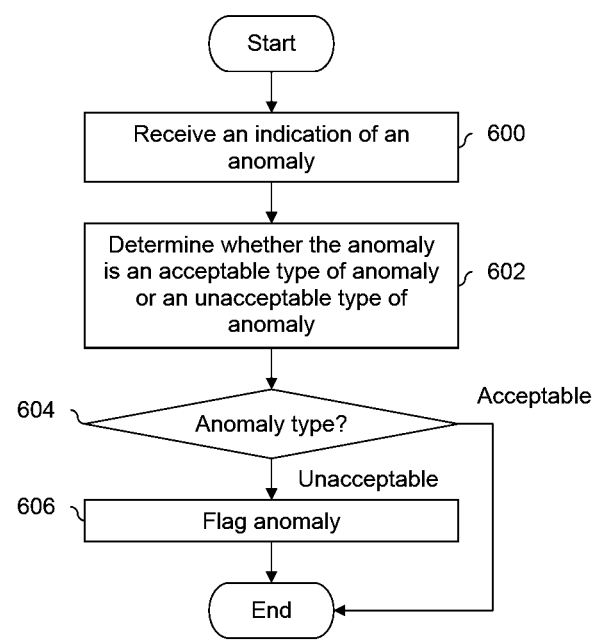
FIG. 6 is a flowchart illustrating an embodiment of a process for activity related anomaly post processing.

FIG. 6 is a flowchart illustrating an embodiment of a process for activity related anomaly post processing. In some embodiments, the process is performed at or after step 106 in FIG. 1. At 600, an indication of an anomaly is received. For example, at this point in the process, an administrator or other master user may not be notified about any anomalies until post processing has completed. At 602, it is determined whether the anomaly is an acceptable type of anomaly or an unacceptable type of anomaly. For example, in the case of hypoactive versus hyperactive anomalies, the values in the column of interest in the temporal behavioral matrix for that particular source vertex may be evaluated. If the average of the values in the column of interest is less than some overall average value, then it may be determined that the anomaly is a hypoactive anomaly (at least in this example). If the average of the values in the column is greater than some overall average, then it may be determined that the anomaly is a hyperactive anomaly. If, at 604, the anomaly type is acceptable, then the process ends (i.e., the anomaly is not flagged). If, at 604, the anomaly type is unacceptable, then the anomaly is flagged at 606. For example, at this point, a system administrator may be notified about the anomaly.

Although the example described above discusses activity related anomaly post processing, any acceptable anomaly may be dismissed (or not) using post processing so long as the acceptable anomalies can be distinguished from anomalies of interest in some manner.

In some applications, post-processing may be preferred over incorporating data which is representative of an acceptable anomaly into a model. For example, if acceptable anomalies span a wide range, then a number of columns or other pieces of data may need to be incorporated which is inconvenient. In contrast, a post processing test or classification of an anomaly type (e.g., classifying an anomaly as a hypoactive anomaly or a hyperactive anomaly) may be relatively easy.

In some systems, behavior varies on a seasonal or periodic basis. The following figure shows some embodiments of temporal behavioral matrices based on some seasonality or periodicity.

FIG. 7 is a diagram showing some embodiments of seasonal or periodic temporal behavioral matrices. In some embodiments, step 102 in FIG. 1 includes generating a seasonal or periodic temporal behavioral matrix. In all of these examples, the x-axis corresponds to specified periodicity. For temporal behavioral matrix 700, the specified periodicity is every December; for temporal behavioral matrix 702, the specified periodicity is an annual shutdown period; for temporal behavioral matrix 704, the specified periodicity is June-August of every year. A seasonal or periodic temporal behavioral matrix may be attractive in applications where behavior or patterns are different for periodic or seasonal periods of time. Put another way, a seasonal or periodic temporal behavioral matrix captures a particular behavior which is normal for a particular, periodic period of time.

In temporal behavioral matrix 700, the x-axis corresponds to the month of December for various years and the y-axis corresponds to various merchants. The values in the temporal behavioral matrix (not shown) correspond to the amount of money spent at a given merchant for a particular December. For example, spending patterns may be different in the month of December compared to other months because of Christmas shopping. People may be spending larger amounts of money and/or at different merchants than they normally would because they are buying presents for other people. Temporal behavioral matrix 700 may be used to model what is normal spending behavior for a particular user, credit card, online wallet, or other source vertex for the month of December, which is different from the rest of the year.

In one example of how temporal behavioral matrix 700 is useful, temporal behavioral matrix 700 (e.g., unlike a temporal behavioral matrix which includes all months in a year) will not necessarily flag an anomaly if a person only shops at a particular merchant during the Christmas season. For example, an older adult without children may not normally shop at a particular toy store, but during the Christmas season they always go back to the same toy store for presents for younger relatives. This activity is less likely to be flagged as an anomaly with temporal behavioral matrix 700.

Temporal behavioral matrix 702 shows an example where the x-axis corresponds to an annual company-wide shutdown, the y-axis corresponds to servers, and the values of temporal behavioral matrix 702 (not shown) correspond to the number of works days (i.e., over a range of [0, 5]) that a given server is accessed by a particular source vertex. During a company-wide shutdown, access goes down significantly since people are required to take vacation days.

In one example of how temporal behavioral matrix 702 is useful, a non-seasonal temporal behavioral matrix which is trained without a shutdown week may flag a shutdown week as an anomaly due to the lack of activity which does not match the training information. In contrast, temporal behavioral matrix 702 will not flag an anomaly if a user or other source vertex does not access some set of servers, because that behavior is typical or explainable in light of previous shutdown weeks.

In the example of temporal behavioral matrix 704, the x-axis corresponds to summer months (i.e., June-August) for various years and the y-axis corresponds to metropolitan areas. The values in temporal behavioral matrix 704 (not shown) correspond to a number of ATM withdrawals.

In one example, the bank account or other source vertex associated with temporal behavioral matrix 704 belongs to a college student. During the summer, the college student returns from college and lives at home, which is in a different metropolitan area. Temporal behavioral matrix 704 will not cause ATM withdrawal(s) in the student's home metropolitan area to be flagged as an anomaly because it matches the student's behavior in previous summers.

Figure 8:
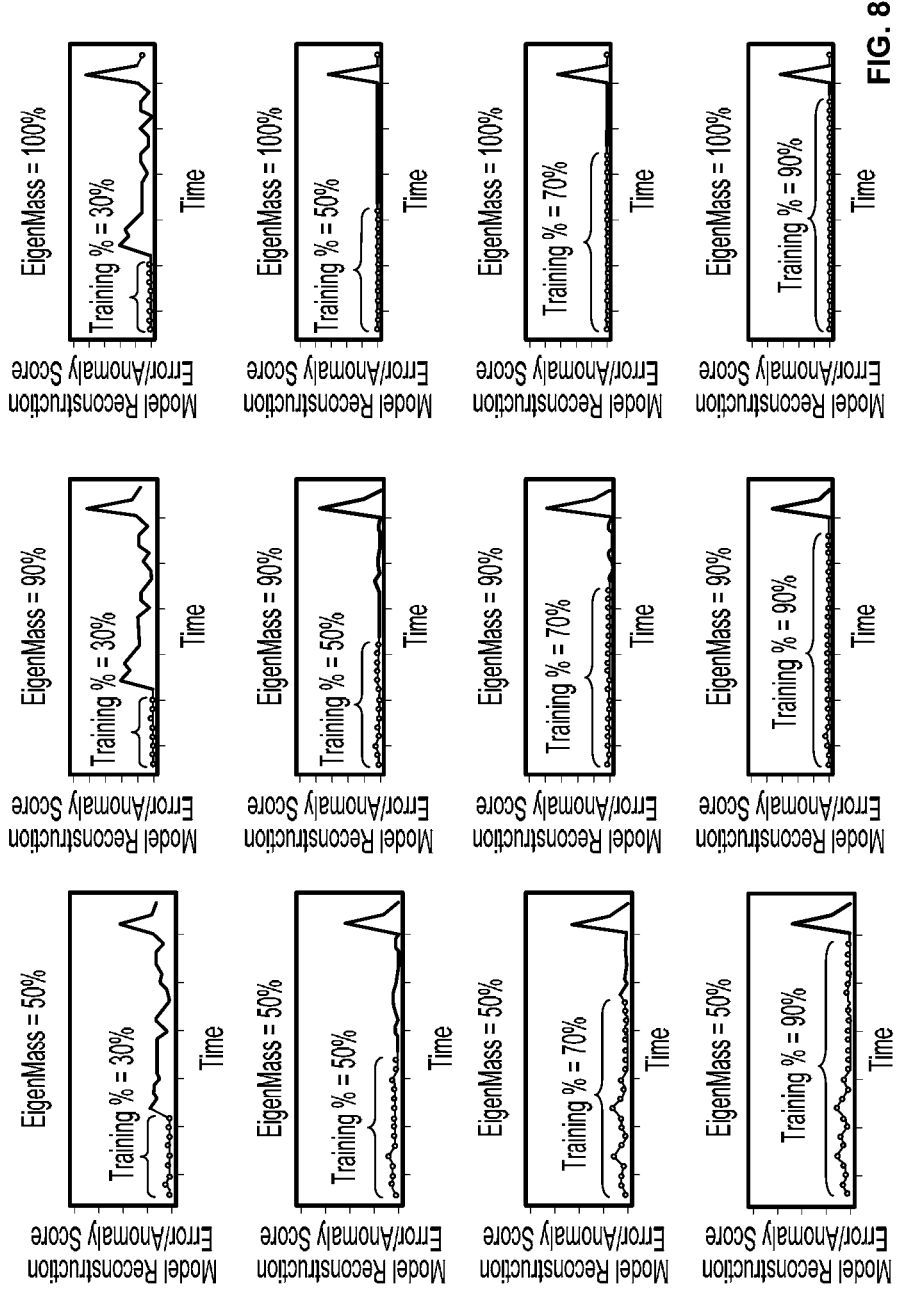
FIG. 8 is a diagram illustrating an embodiment of model reconstruction errors and anomaly scores associated with a variety of combinations of EigenMass values and training percentage values.

FIG. 8 is a diagram illustrating an embodiment of model reconstruction errors and anomaly scores associated with a variety of combinations of EigenMass values and training percentage values. In the example shown, tuning is being performed to determine the value of an EigenMass parameter and a training percentage parameter. For example, these tuned parameters may be used at step 104 in FIG. 1 to generate a model. In this example, the parameters are associated with a PCA model but other parameters associated with other models may be tuned in a similar manner.

In each of the graphs shown, the same temporal behavioral matrix is used, but different models are generated based on the particular EigenMass value (e.g., the ratio between the sum of these K eigenvalues and the sum of all eigenvalues, as described above with respect to step 104 in FIG. 1) and training percentage value. For each graph, the training percentage controls the percentage (e.g., of columns, going from left to right) of the temporal behavioral matrix which is used to generate the model. See, for example, the indicated training portion for each graph (e.g., shown with a narrower line with dots) and the testing portion (e.g., shown with a thicker line without dots). The remaining percentage of the temporal behavioral matrix is used to test the model generated. In some embodiments, the values in the testing portion (shown with a thicker line without dots) are reconstruction errors and each value in the testing portion is generated from a corresponding column of testing data in the temporal behavioral matrix applied to a given model configured with a particular set of parameters (i.e., $e_t = \|(I-PP^T)x_t\|$).

The EigenMass value controls the level of detail or degree of specificity with which the model remembers or is able to recreate the training data. For example, an EigenMass value of 100% will cause the resulting model to be able to perfectly reconstruct the training data used to generate the model. Note, for example, that the model reconstruction error is a steady 0 for all graphs which have an EigenMass value of 100%.

The y-axis of each graph shows the model reconstruction errors and anomaly scores. Model reconstruction errors correspond to training data and anomaly scores correspond to testing data. For example, if the training percentage is set to 30%, then the first 30% of the scores shown are model reconstruction errors and the last 70% of the scores are anomaly scores. Both model reconstruction errors and anomaly scores are generated by applying a generated model to a particular column in the temporal behavioral matrix. If the column is used for training, then the output value is a model reconstruction error. If the column is used for testing, then the output value is an anomaly score.

In some embodiments, the choice of EigenMass parameter and training/testing percentages depend on model operation scenarios. EigenMass controls the model generalization power. For example, model generated with an EigenMass of 100% reconstructs the training data perfectly but will have no generalization power. It will have significant false positives on test data that have only slight variations from the training data. Choosing this threshold, for example to be a value of 90%, is part of model tuning effort for model operation. As such, in some embodiments, an EigenMass value which is strictly less than 100% (e.g., 90%) is desirable (e.g., to avoid the problem of generating a significant number of false positives as described above).

In some embodiments, selecting an EigenMass value includes evaluating an reconstruction error ($e_t$) associated with the PCA model where $e_t$ is obtained using $\|(I-PP^T)x_t\|$. I is the identity matrix, $PP^T$ is a PCA model configured with a particular set of parameters and represented in matrix form, and $x_t$ is a vector of testing data from the temporal behavioral matrix (e.g., each of the values in the testing portions of the graphs shown in FIG. 8 is a reconstruction error and the $x_t$ used to generate that particular reconstruction error comes from a corresponding column vector in the temporal behavioral matrix).

In some embodiments, determination of a training and testing percentage is based on how stable the behavior of testing data is against that of training data in the model's deployed environment. In an environment where data behavior changes infrequently, a short training period is sufficient to capture the data behavior. In an environment where data is more dynamic (i.e., data behavior changes frequently), a longer training period is required to capture the data behavior. Put another way, in some embodiments, the training period scales with how dynamic the data is.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for detecting an anomaly, comprising:
running, on a first production segment included in a massively parallel processing (MPP) system, a first anomaly detection process, including:
generating a first bipartite graph based on first log data, wherein the first bipartite graph includes one or more first source vertices and one or more first destination vertices;
generating, for a first source vertex of the one or more first source vertices where the first source vertex is associated with the first production segment, a first temporal behavioral matrix using the first bipartite graph, wherein:
a first dimension of the first temporal behavioral matrix is associated with time;
a second dimension of the first temporal behavioral matrix is associated with at least one of the one or more first destination vertices; and
the first production segment exclusively generates the first log data which includes first source vertex log data, such that the first source vertex log data is confined to the first production segment in the MPP system; and
generating, for the first source vertex, a first model using at least some portion of the first temporal behavioral matrix; and
running, on a second production segment included in the MPP system, a second anomaly detection process, including:
generating a second bipartite graph based on second log data, wherein the second bipartite graph includes one or more second source vertices and one or more second destination vertices;
generating, for a second source vertex of the one or more second source vertices, the second source vertex being associated with the second production segment, a second temporal behavioral matrix using the second bipartite graph, wherein:
a first dimension of the second temporal behavioral matrix is associated with time;
a second dimension of the second temporal behavioral matrix is associated with at least one of the one or more second destination vertices; and
the second production segment exclusively generates the second log data which includes second source vertex log data, such that the second source vertex log data for the second source vertex is confined to the second production segment in the MPP system; and
generating, for the second source vertex, a second model using at least some portion of the second temporal behavioral matrix.

2. The method of claim 1, wherein at least one of generating the first bipartite graph or the second bipartite graph includes:
obtaining data representative of an acceptable anomaly; and
inserting the representative data into the first or second bipartite graph, respectively.

3. The system of claim 1, wherein at least one of generating the first temporal behavioral matrix or the second temporal behavioral matrix includes:
   obtaining data representative of an acceptable anomaly; and
   inserting the representative data into the first or second temporal behavioral matrix, respectively.

4. The method of claim 1, wherein at least one of running the first anomaly detection process on the first production segment or the second anomaly detection process on the second production segment further includes:
   determining whether an anomaly is an acceptable type of anomaly or an unacceptable type of anomaly; and
   in the event the anomaly is an unacceptable type of anomaly, flagging the anomaly.

5. The method of claim 4, wherein the acceptable type of anomaly includes hypoactive anomalies and the unacceptable type of anomaly includes hyperactive anomalies.

6. The method of claim 1, wherein generating at least one of the first temporal behavioral matrix or the second temporal behavioral matrix includes generating a seasonal temporal behavioral matrix wherein the first dimension of the first or second temporal behavioral matrix has a specified periodicity, respectively.

7. The method of claim 1, wherein generating at least one of the first model or the second model includes generating a principal component analysis (PCA) model, respectively.

8. The method of claim 7, wherein generating the PCA model includes using one or more of the following: (1) a parameter associated with a level of detail with which the PCA model is able to recreate training data or (2) a parameter associated with a split in the first or second temporal behavioral matrix between training and testing, respectively.

9. The method of claim 8, wherein:
   the parameter associated with the level of detail with which the PCA model is able to recreate the training data is strictly less than 100%.

10. The method of claim 8, wherein generating the PCA model includes selecting a value for the parameter associated with the level of detail with which the RCA model is able to recreate the training data, including by evaluating a reconstruction error ($e_r$) associated with the PCA model, wherein $e_r$ is obtained using $\|(I-PP^T)x_t\|$, I is an identity matrix, $PP^T$ is the PCA model configured with a particular set of parameters and represented in matrix form, and $x_t$ is a vector of testing data from the first or second temporal behavioral matrix, respectively.

11. A system for detecting an anomaly, comprising:
   a first production segment, included in a massively parallel processing (MPP) system, that is configured to run a first anomaly detection process, including:
      generating a first bipartite graph based on first log data, wherein the first bipartite graph includes one or more first source vertices and one or more first destination vertices;
      generating, for a first source vertex of the one or more first source vertices where the first source vertex is associated with the first production segment, a first temporal behavioral matrix using the first bipartite graph, wherein:
         a first dimension of the first temporal behavioral matrix is associated with time;
         a second dimension of the first temporal behavioral matrix is associated with at least one of the one or more first destination vertices; and
         the first production segment exclusively generates the first log data which includes first source vertex log data, such that the first source vertex log data is confined to the first production segment in the MPP system; and
      generating, for the first source vertex, a first model using at least some portion of the first temporal behavioral matrix; and
   a second production segment, included in the MPP system, that is configured to run a second anomaly detection process, including:
      generating a second bipartite graph based on second log data, wherein the second bipartite graph includes one or more second source vertices and one or more second destination vertices;
      generating, for a second source vertex of the one or more second source vertices, the second source vertex being associated with the second production segment, a second temporal behavioral matrix using the second bipartite graph, wherein:
         a first dimension of the second temporal behavioral matrix is associated with time;
         a second dimension of the second temporal behavioral matrix is associated with at least one of the one or more second destination vertices; and
         the second production segment exclusively generates the second log data which includes second source vertex log data, such that the second source vertex log data for the second source vertex is confined to the second production segment in the MPP system; and
      generating, for the second source vertex, a second model using at least some portion of the second temporal behavioral matrix.

12. The system of claim 11, wherein at least one of generating the first bipartite graph or the second bipartite graph includes:
   obtaining data representative of an acceptable anomaly; and
   inserting the representative data into the first or second bipartite graph, respectively.

13. The system of claim 11, wherein generating at least one of the first temporal behavioral matrix or the second temporal behavioral matrix includes:
   obtaining data representative of an acceptable anomaly; and
   inserting the representative data into the first or second temporal behavioral matrix, respectively.

14. The system of claim 11, wherein generating at least one of the first model or the second model includes generating a principal component analysis (PCA) model, respectively.

15. The system of claim 14, wherein generating the PCA model includes using one or more of the following: (1) a parameter associated with a level of detail with which the PCA model is able to recreate training data or (2) a parameter associated with a split in the first or second temporal behavioral matrix between training and testing, respectively.

16. A computer program product for detecting an anomaly, the computer program product being embodied in a non-transitory computer readable storage medium and comprising computer instructions for:
   running, on a first production segment included in a massively parallel processing (MPP) system, a first anomaly detection process, including:
      generating a first bipartite graph based on first log data, wherein the first bipartite graph includes one or more first source vertices and one or more first destination vertices;

generating, for a first source vertex of the one or more first source vertices where the first source vertex is associated with the first production segment, a first temporal behavioral matrix using the first bipartite graph, wherein:
- a first dimension of the first temporal behavioral matrix is associated with time;
- a second dimension of the first temporal behavioral matrix is associated with at least one of the one or more first destination vertices; and
- the first production segment exclusively generates the first log data which includes first source vertex log, such that the first source vertex log data is confined to the first production segment in the MPP system; and generating, for the first source vertex, a first model using at least some portion of the first temporal behavioral matrix; and running, on a second production segment included in the MPP system, a second anomaly detection process, including:

generating a second bipartite graph based on second log data, wherein the second bipartite graph includes one or more second source vertices and one or more second destination vertices;

generating, for a second source vertex of the one or more second source vertices, the second source vertex being associated with the second production segment, a second temporal behavioral matrix using the second bipartite graph, wherein:
- a first dimension of the second temporal behavioral matrix is associated with time;
- a second dimension of the second temporal behavioral matrix is associated with at least one of the one or more second destination vertices; and
- the second production segment exclusively generates the second log data which includes second source vertex log data, such that the second source vertex log data for the second source vertex is confined to the second production segment in the MPP system; and generating, for the second source vertex, a second model using at least some portion of the second temporal behavioral matrix.

17. The computer program product of claim 16, wherein at least one of running the first or second anomaly detection process on the first production segment or the second production segment further includes:
- determining whether an anomaly is an acceptable type of anomaly or an unacceptable type of anomaly; and
- in the event the anomaly is an unacceptable type of anomaly, flagging the anomaly.

18. The computer program product of claim 17, wherein the acceptable type of anomaly includes hypoactive anomalies and the unacceptable type of anomaly includes hyperactive anomalies.

19. The computer program product of claim 16, wherein at least one of generating the first temporal behavioral matrix or the second temporal behavioral matrix includes generating a seasonal temporal behavioral matrix wherein the first dimension of the first or second temporal behavioral matrix has a specified periodicity, respectively.

20. The computer program product of claim 16, wherein at least one of generating the first model or the second model includes generating a principal component analysis (PCA) model, respectively.

21. The computer program product of claim 20, wherein generating the PCA model includes using one or more of the following: (1) a parameter associated with a level of detail with which the PCA model is able to recreate training data or (2) a parameter associated with a split in the first or second temporal behavioral matrix between training and testing, respectively.

22. The computer program product of claim 21, wherein:
the parameter associated with the level of detail with which the PCA model is able to recreate the training data is strictly less than 100%.

23. The computer program product of claim 21, wherein generating the PCA model includes selecting a value for the parameter associated with the level of detail with which the PCA model is able to recreate the training data, including by evaluating a reconstruction error ($e_t$) associated with the PCA model, wherein $e_t$ is obtained using $\|(I-PP^T x_t\|$, I is an identity matrix, $PP^T$ is the PCA model configured with a particular set of parameters and represented in matrix form, and $x_t$ is a vector of testing data from the first or second temporal behavioral matrix, respectively.

* * * * *